United States Patent

[11] 3,565,203

[72] Inventors Robert Ashton
 Islington, Ontario;
 Wilbert D. Weber, Nashville, Ontario,
 Canada
[21] Appl. No. 781,172
[22] Filed Dec. 4, 1968
[45] Patented Feb. 23, 1971
[73] Assignee Massey-Ferguson Industries Limited
 Toronto, Ontario, Canada

[54] COMBINE ENGINE COOLING ARRANGEMENT
 8 Claims, 4 Drawing Figs.
[52] U.S. Cl. .................................................. 180/68
[51] Int. Cl. .............................................. B60k 11/04
[50] Field of Search........................................... 180/68, 54
 (A), 1; 56/21, 20

[56] References Cited
 UNITED STATES PATENTS
1,724,649 8/1929 Fischer .................... 180/54(A)
1,860,697 5/1932 Traviss ........................ 180/68PUX 1,882,319 10/1932 Gurney........................ 180/54(A)
3,226,918 1/1966 Jarvis ............................ 56/20
3,406,505 10/1968 Hanson ........................ 56/21
3,448,566 6/1969 Van Der Lely ............ 56/21

FOREIGN PATENTS
710,588 6/1954 Great Britain................ 180/54A

Primary Examiner—Benjamin Hersh
Assistant Examiner—Milton L. Smith
Attorney—Gerhardt, Greenlee & Farris ABSTRACT: A grain-harvesting apparatus with an engine enclosed in an engine compartment and a radiator for cooling the engine in a radiator compartment. A fan pulls filtered air into the engine compartment creating a positive pressure in the compartment thereby keeping dust and chaff out and cooling the compartment. Another fan pulls air into the radiator compartment through screen sections of the compartment walls, through the radiator and exhausts the hot air away from the operator's platform.

PATENTED FEB 23 1971

INVENTORS
ROBERT ASHTON
BY WILBERT D. WEBER

Tweedale & Gerhardt
ATTORNEYS

INVENTORS
ROBERT ASHTON
BY WILBERT D. WEBER

Tweedale & Gerhardt
ATTORNEYS

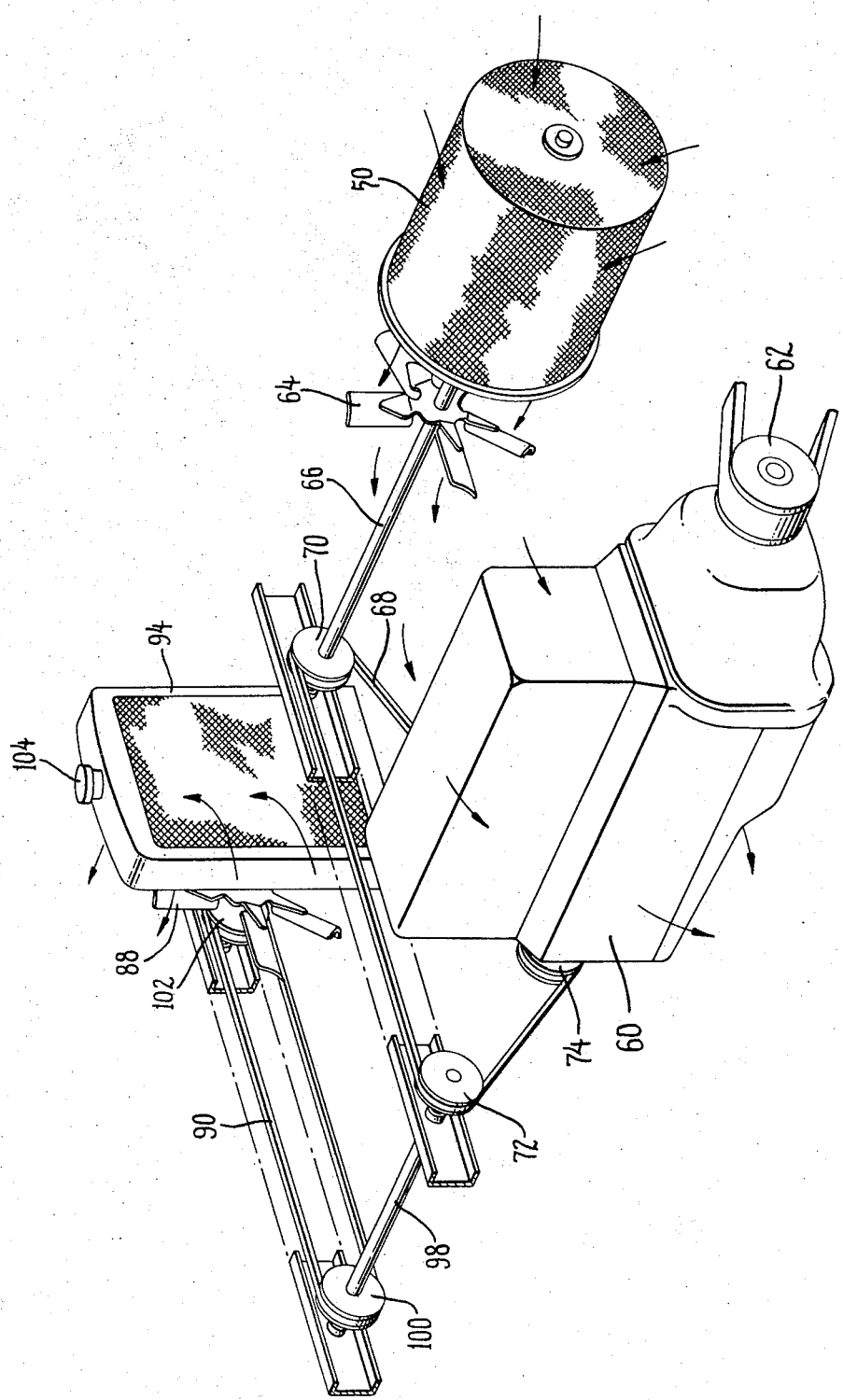

COMBINE ENGINE COOLING ARRANGEMENT

The present invention relates to agricultural harvesting machines which are adapted to pass over a field for harvesting crops. More particularly this invention concerns the construction and arrangement of the engine, the engine compartment, the radiator, and the radiator compartment of a self-propelled combine.

Although several different arrangements are used, the best arrangement presently in use has the engine located on top of the separator, above the traction drive wheels, in front of the grain storage tank near the operator's platform. In this location, the weight can be easily supported, power can be transferred to the separator and the traction drive wheels with relative ease and the engine controls and clutch linkages are simple when compared to other arrangements. Also the air intake for the radiator can be located high and toward the front of the machine where there is relatively little dust and chaff. Although it has been found advantageous to enclose an engine in this location in a compartment to protect it and the power transmission elements, it is still more accessible for service when located on top of the separator in front of the grain tank than in other locations.

The placement of the engine, on top of the separator, in front of the grain tank, and adjacent the operator's platform has created some problems however. The air which is first drawn through a screen, then through a radiator and finally into the engine compartment by a fan makes the walls of the engine compartment relatively warm. Also the air which passes out through various holes in the engine compartment is hot. To keep this heat away from the operator's platform, a second sidewall has been placed inside the engine compartment between the operator's platform and the engine compartment. This has helped but is not a complete solution to the heat problem. Another solution to the problem has been to reverse the fan on the radiator so that it pulls cool air, through filters into the engine compartment, around the engine, through the radiator and then exhausts the hot air from the side of the engine compartment away from the operator's platform. This solution keeps the heat away from the operator's platform by keeping the engine compartment relatively cool. However, it creates a partial vacuum in the engine compartment causing dust, dirt and chaff to be drawn into the engine compartment through all of the holes and cracks in the compartment. It has been found to be virtually impossible to close all of the holes and cracks to protect the engine from dust and dirt and to minimize fire hazards.

It is an object of this invention to provide a self-propelled combine which has an engine compartment that is pressurized and cooled by filtered air.

It is a further object of this invention to provide a self-propelled combine with a radiator, for cooling the engine, in a separate radiator compartment located in such a position that the heat dissipated near the operator's platform is minimized.

Other objects and advantages of the invention will become apparent upon reading the following detailed description and upon reference to the drawings in which:

FIG. 4 is a fragmentary perspective view showing the drive arrangement for the fans.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

Figure 1:
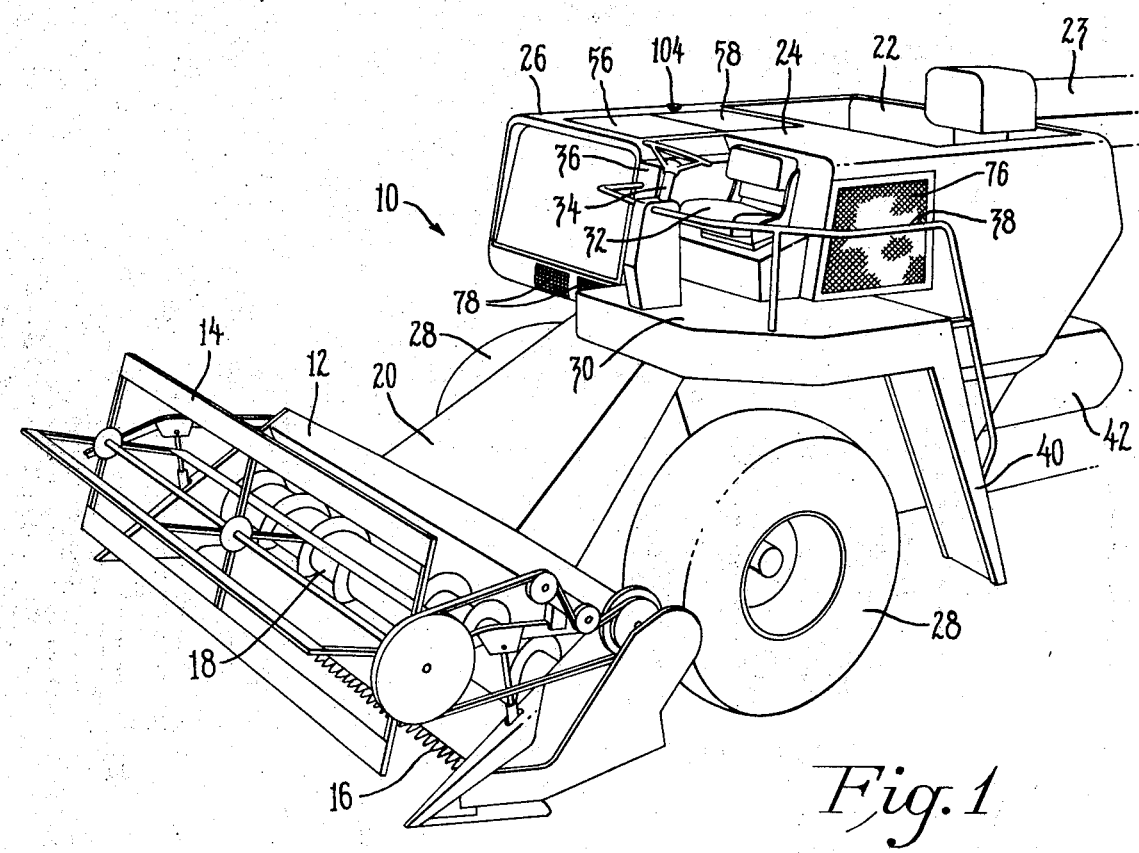
FIG. 1 is a prospective view taken from the left front of a portion of a self-propelled combine employing the engine compartment and radiator compartment arrangements of this invention.

Turning now to the drawings, there is shown in FIG. 1 a self-propelled combine 10 embodying the present invention. The combine includes a table 12 with a reel 14, a cutter bar 16, and an auger 18. Crops which are cut the by cutter bar 16 are delivered by the auger 18 to an elevator 20 which in turn carries the cut straw and grain to the separator assembly. After the grain is separated from the straw by the separator assembly, it is temporarily stored in a grain tank 22 that has a conveyor means 23 for moving the grain from the grain tank to a truck. An engine compartment 24 and a radiator compartment 26 are located in front of the grain tank 22 and above the traction drive wheels 28. The operator's platform 30 with a seat 32, a steering assembly 34, a control console 36, a guard rail 38, and a ladder 40 are located on the left side of the machine in front of the grain tank 22. A fuel tank 42 is located on the left side of the machine behind the grain tank.

Figure 2:
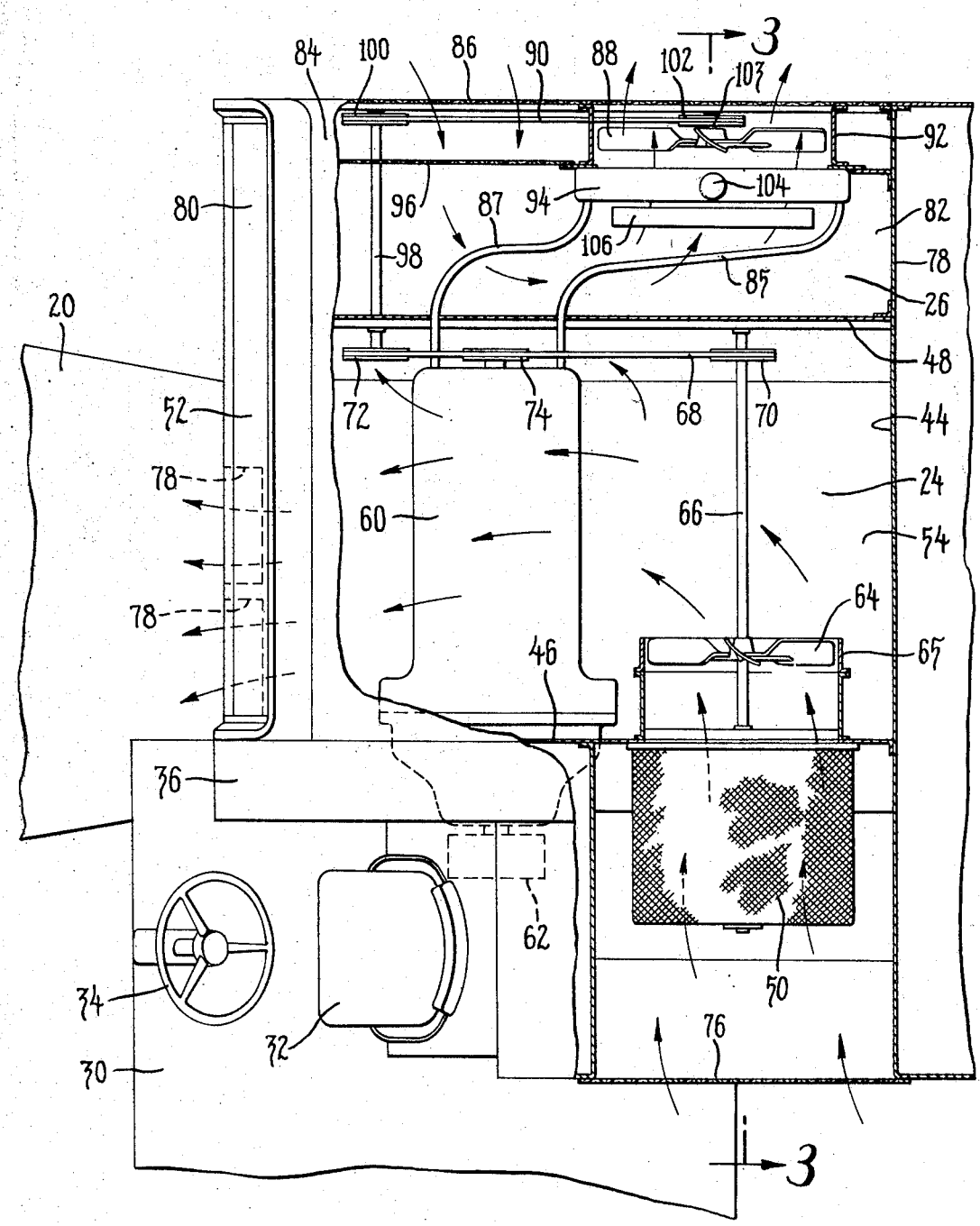
FIG. 2 is a plan view of a portion of the self-propelled combines of FIG. 1 showing the engine compartment, radiator compartment, and operator's platform.

The engine compartment 24 (see FIG. 2) has a rear wall 44, a left sidewall 46, a right sidewall 48, a front wall 52, a floor 54 and a top. The top of the engine compartment consists of two access lids 56 and 58 (SEE FIG. 1) which may be raised to service the engine. An engine 60 is located in the forward section of the compartment. Various assemblies (not shown) such as hydraulic pumps and a countershaft are driven by the engine. The power to run the separator and the traction drive wheels comes from the pulley 62 on the rear of the engine.

The engine compartment is cooled and pressurized by a fan 64 on a shaft 66. The fan 64 is surrounded by baffles 65 which form a passage. The shaft 66 is driven by a belt 68 which runs on pulleys 70 and 72 and is driven by pulley 74 on the front end of the engine. The air which the fan 64 pulls into the engine compartment first passes through a grill 76 on the left side of the machine behind the operator's platform and then through a rotary air screen 50. The rotary air screen 50 can be positively driven by the shaft 66 or it may be driven by the air moving through it in manner well known in the art.

By creating a pressure in the engine compartment slightly above atmospheric pressure, the amount of dust and chaff entering the engine compartment can be reduced to a minimum. Dust and chaff in the engine compartment are very objectionable because they will reduce the useful life of the various assemblies in the compartment and also create a fire hazard. If a slight vacuum is maintained in the engine compartment which is the case when an exhaust fan is employed, dirt and chaff enter the engine compartment through even the smallest holes.

The radiator compartment has a wall 48 between it and the engine compartment, a rear wall 78, a front wall 80, a floor 82, a top 84, and a right sidewall 86. The radiator cap 104 protrudes through the top 84 of the compartment conventional radiator hoses 85 and 87 pass through wall 48 to conduct coolant between the radiator 94 and the engine 60. The right sidewall 86 is a grill to protect fan 88 and belt 90. The fan 88 is surrounded by baffles 92 which insure that it pulls air through the radiator 94 and exhausts the hot air through the grill 86 on the side of the machine. If needed, an additional heat transfer device 106 such as a condenser for air conditioning may be placed next to the radiator. The air which the fan 88 pulls through the radiator and the heat transfer device enters the radiator compartment through the grill 86 and filter means 96. The filter 96 consists of a screen. The radiator compartment front wall 80, floor 82 and top 84 may be constructed partially or completely of screen material to allow entry of air into the compartment and to keep chaff out.

Figure 3:
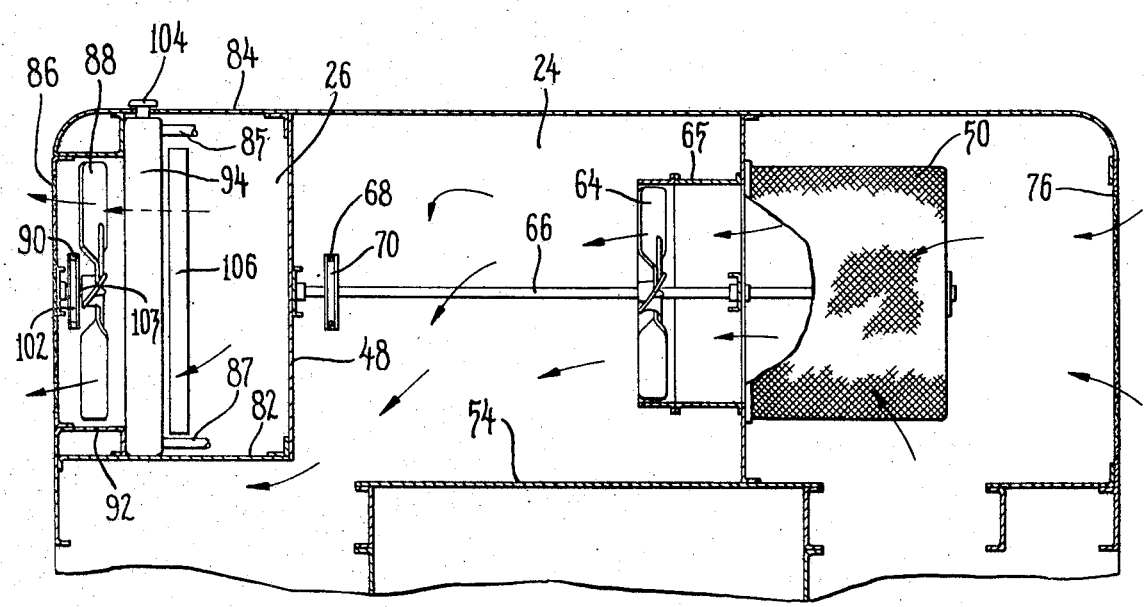
FIG. 3 is a fragmentary sectional view taken along lines 3—3 of FIG. 2.

Exhaust ports are placed in the engine compartment so that air pulled in by fan 64 will circulate in and around the engine and other assemblies as indicated by the arrows in FIG. 3. The exhaust ports 78 in the lower portion of front wall 52 of the engine compartment are located so that the air passing through them will blow dust and chaff down the elevator 20 toward the front of the machine and away from the operator's platform. Air also passes out of the compartment through a port between the floor 54 and the right sidewall 48 in the lower right side of the engine compartment. The air passes under the radiator compartment 26 as indicated by arrows in FIG. 3 and tends to flow dust and chaff down and away from the air filter surfaces of the radiator compartment 26.

The radiator fan 88 is driven by the pulley 74 on the engine and a belt 68 through a pulley 72, a counter shaft 98, another pulley 100, a belt 90, and a pulley 102 connected to the fan shaft 103. Idler pulleys (not shown) are used to adjust the tension of the belts 68 and 100.

Although, it is advantageous to locate the radiator compartment next to the engine compartment as described above, the compartment could be located in various other places on the machine. The radiator could also be mounted with a fan on one side and a conventional air screen on the other rather than in a compartment if desired.

In operation, the fans 64 and 88 described above operate continuously. The radiator compartment fan 88 circulates air through a radiator compartment 26, completely separate from the engine compartment 24, and the radiator and exhausts hot air away from the operator's platform 30. The engine compartment fan 64 will pull air through an air filter 50 and force it into the engine compartment 24 thereby cooling the compartment, keeping dust and chaff out and keeping heat away from the operator's platform 30 and the control console 36. The air is exhausted from the engine compartment so that it blows dust and chaff away from the operator's platform and the radiator compartment.

It should be understood that if it is not intended to limit the invention to the above described forms and details, and that the invention includes such other forms and modifications as are embraced by the scope of the following claims.

We claim:

1. In a self-propelled combine having a wheeled frame with units mounted thereon for performing conventional crop harvesting and treating operations, the combination including:
   an operator's platform mounted on the frame;
   an enclosed engine compartment mounted on the frame;
   a liquid cooled engine mounted in the enclosed engine compartment;
   first fan means to force cool air into the engine compartment to create a pressure above atmospheric pressure in the engine compartment;
   an air intake filter to filter the air forced into the engine compartment by said first fan means;
   means to transmit power from the liquid cooled engine to propel the combine and operate the units for crop harvesting and treating;
   an enclosed radiator compartment, mounted on the frame;
   a radiator for cooling the engine mounted in the enclosed radiator compartment;
   screened air intake for filtering the air which enters said radiator compartment;
   second fan means mounted inside the radiator compartment for causing air to flow through the screened air intake and through the radiator; and
   a plurality of ports for the escape of air from the engine compartment including at least one port located in a position relative to the radiator compartment so that the air passing through said one port tends to blow dust and chaff away from the air intake sections of the radiator compartment.

2. The self-propelled combine of claim 1 wherein the engine compartment air intake filter is a rotary air screen.

3. The self-propelled combine of claim 1 in which at least one of the ports for the escape of air from the engine compartment is located in a position relative to the operator's platform so that the air that passes through said one of the ports tends to blow dust and chaff away from the operator's platform.

4. The self-propelled combine of claim 1 wherein the operator's platform is located adjacent to the engine compartment and the engine compartment air intake filter for the entry of air into the engine compartment is located on the side of the machine opposite the radiator compartment and near the operator's platform.

5. In a self-propelled combine having a wheeled frame with units mounted thereon for performing conventional crop harvesting and treating operations, the combination including:
   an operator's platform mounted on the frame;
   an enclosed engine compartment mounted on the frame;
   a liquid cooled engine mounted in the enclosed engine compartment:
   first fan means to force cool air into the engine compartment to create a pressure above atmospheric pressure in the engine compartment;
   an air intake filter to filter the air forced into the engine compartment by said first fan means;
   means to transmit power from the liquid cooled engine to propel the combine and operate the units for crop harvesting and treating;
   an enclosed radiator compartment, mounted on the frame;
   a radiator for cooling the engine mounted in the enclosed radiator compartment;
   screened air intake for filtering the air which enters said radiator compartment;
   second fan means mounted inside the radiator compartment for causing air to flow through the screened air intake and through the radiator; and
   a plurality of ports for the escape of air from the engine compartment including at least one port located in a position relative to the opertor's platform so that the air that passes through said one port tends to blow dust and chaff away from the operator's platform.

6. In a self-propelled combine having a wheeled frame with units mounted thereon for performing conventional crop harvesting and treating operations, the combination including:
   an operator's platform mounted on the frame;
   an enclosed engine compartment mounted on the frame adjacent to the operator's platform;
   a liquid cooled engine mounted in the enclosed engine compartment;
   first fan means to force cool air into the engine compartment to create a pressure above atmospheric pressure in the engine compartment;
   a air intake filter, to filter the air forced into the engine compartment by said first fan means, located adjacent to the operator's platform and toward one side of the engine compartment;
   means to transmit power from the liquid cooled engine to propel the combine and operate the units for crop harvesting and treating;
   an enclosed radiator compartment mounted on the frame on the side of the machine opposite the air intake filter for the engine compartment;
   radiator for cooling the engine mounted in the enclosed radiator compartment;
   screened air intake for filtering the air which enters said radiator compartment;
   second fan means mounted inside the radiator compartment for causing air to flow through the screened air intake and through the radiator; and
   a plurality of ports for the escape of air from the engine compartment.

7. The self-propelled combine of claim 6 in which at least one of the ports for the escape of air from the engine compartment is located in a position relative to the radiator compartment so that the air that passes through said one of the ports tends to blow dust and chaff away from the air intake sections of the radiator compartment.

8. The self-propelled combine of claim 6 in which at least one of the ports for the escape of air from the engine compartment is located in a position relative to the operator's platform so that the air that passes through said one of the ports tends to blow dust and chaff away from the operator's platform.